(12) United States Patent
Specht et al.

(10) Patent No.: US 6,296,306 B1
(45) Date of Patent: Oct. 2, 2001

(54) VEHICLE SEAT

(75) Inventors: Martin Specht, Feldafing; Rudolf Meyer, Odelzhausen, both of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/515,765

(22) Filed: Mar. 1, 2000

(30) Foreign Application Priority Data

Jul. 8, 1999 (DE) .................................. 199 31 894

(51) Int. Cl.$^7$ ........................................ B60N 2/42
(52) U.S. Cl. .................. 297/216.14; 297/216.13; 297/362.11; 297/378.11
(58) Field of Search ................ 297/216.1, 216.13, 297/216.14, 362.11

(56) References Cited

U.S. PATENT DOCUMENTS

| | | | |
|---|---|---|---|
| 4,257,569 | * 3/1981 | Budinski | 248/394 |
| 4,402,547 | * 9/1983 | Weston et al. | 297/378.11 |
| 4,675,587 | * 6/1987 | Sugiyama | 318/568.1 |
| 5,103,691 | * 4/1992 | Periou | 74/665 GD |
| 5,295,729 | * 3/1994 | Viano | 297/216.14 |
| 5,393,123 | * 2/1995 | Hernandez et al. | 297/378.12 |
| 5,437,494 | * 8/1995 | Beauvais | 297/216.19 |
| 5,454,622 | * 10/1995 | Demopoulos | 297/216.14 |
| 5,597,205 | * 1/1997 | Glance et al. | 297/362.14 |
| 5,626,203 | * 5/1997 | Habib | 180/274 |
| 5,694,320 | * 12/1997 | Breed | 364/424.055 |
| 5,730,411 | * 3/1998 | Pawlowicz et al. | 248/421 |
| 5,810,417 | * 9/1998 | Jesadanont | 296/68.1 |

FOREIGN PATENT DOCUMENTS

| | | |
|---|---|---|
| 4302042 | 7/1994 | (DE) . |
| 19706290 | 8/1998 | (DE) . |
| 2179997-A | * 3/1987 | (GB) . |

* cited by examiner

Primary Examiner—Peter M. Cuomo
Assistant Examiner—Joseph Edell
(74) Attorney, Agent, or Firm—Lonnie R. Drayer

(57) ABSTRACT

A vehicle seat has an adjustable backrest connected to a driving device that can be activated in the event of a rear end collision. The backrest is inclined forwardly during the rear end collision and then performs an opposing rearward movement decelerated by an energy absorber.

11 Claims, 6 Drawing Sheets

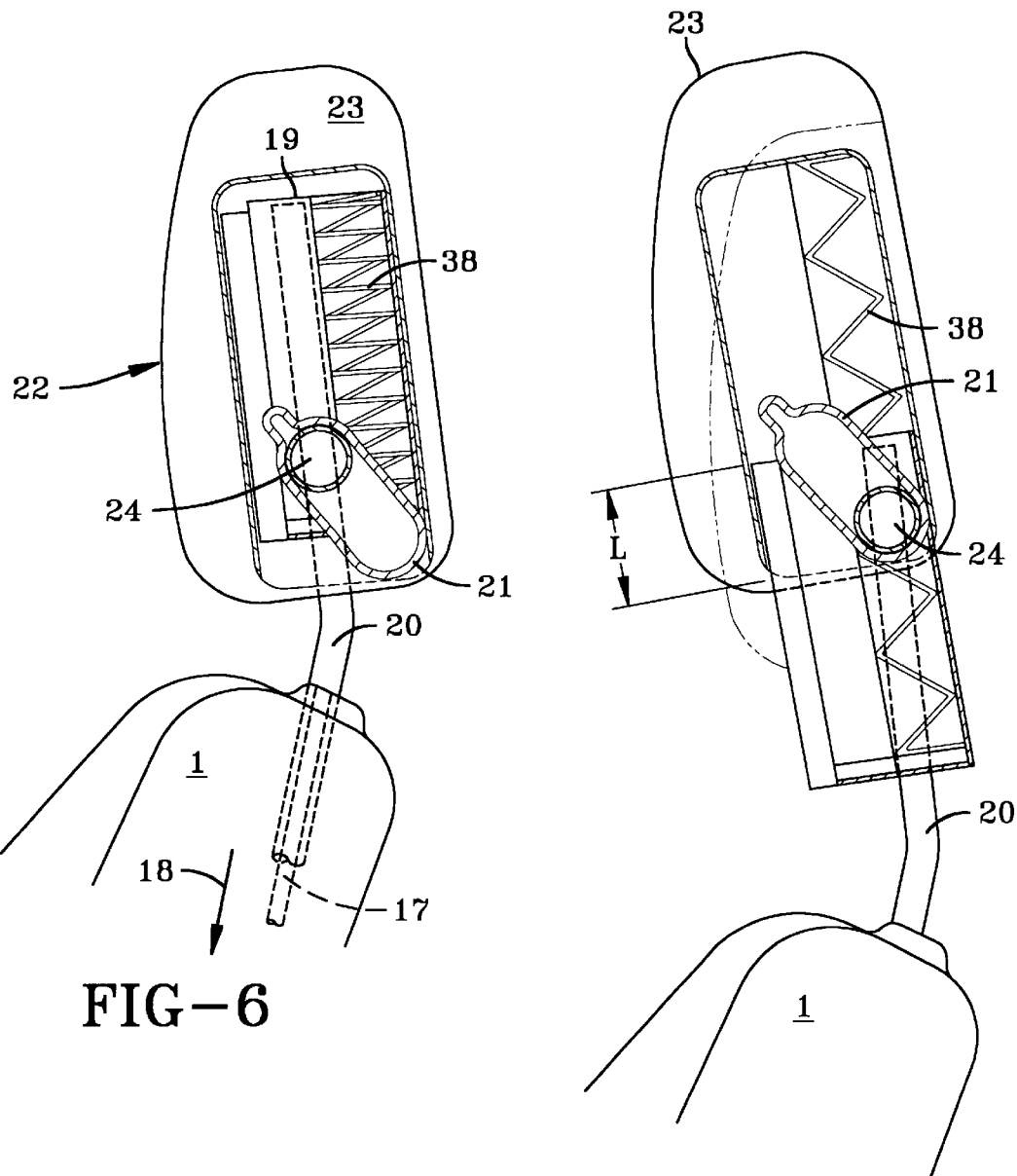
FIG-6
FIG-7
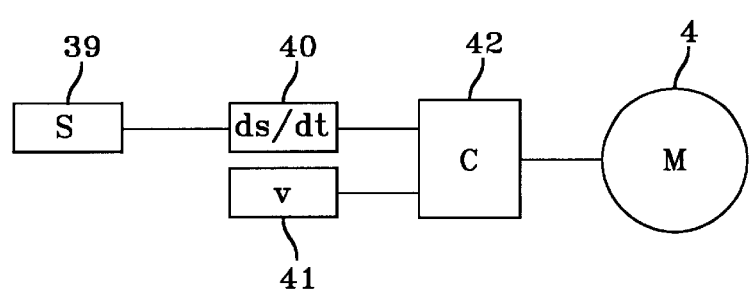
FIG-8

VEHICLE SEAT

FIELD OF THE INVENTION

The invention relates to a vehicle seat with an adjustable backrest.

BACKGROUND OF THE INVENTION

It is known to adjust the angle of inclination of the backrest using a hand wheel or an electric motor. A rotational movement produced in this way is transmitted to the backrest via a step-down gear that is formed by a wobble mechanism in most cases.

With conventional vehicle seats there is the risk in the event of a rear end collision, owing to the relatively pronounced flexibility of the backrest cushioning for comfort requirements, that the vehicle occupant will slide up along the backrest. In particular, if the headrest is adjusted too low, the headrest acts only as a slight restraint, resulting in over-stretching of the back of the neck and excessive straining of the back of the neck and resultant injuries to the cervical vertebra.

SUMMARY OF THE INVENTION

There is provided in accordance with the present invention a vehicle seat wherein the restraint function is improved in the event of a rear end collision with a trailing vehicle. The backrest is inclined forwardly in the event of a rear end collision or on the response of a pre-crash sensor. At the same time, the headrest can be moved upwardly and/or forwardly. A corresponding drive acts on the rigid backrest frame. The flexibility of the backrest cushioning allows forward adjustment of the backrest. This ensures that the backrest is brought into an upright position or in the direction of an upright position and optionally additionally forwardly and that continuous contact with the vehicle occupant's back exists in the backrest region. The upward and/or forward adjustment of the headrest also ensures that the occupant's head makes early contact with the headrest. The prerequisite whereby the vehicle occupant's body remains fixed on the vehicle seat in the event of a rear end collision is satisfied. The risks of injury existing with known vehicle seats are considerably reduced.

Furthermore, an energy absorber is connected to the backrest via an associated separate guide means after the forwardly directed adjustment of the backrest. An opposing, rearwards movement of the backrest following the forward adjustment is decelerated by the energy absorber. This rearwards directed movement of the backrest is due to the correspondingly directed movement of the vehicle occupant in relation to the vehicle seat during the rebound phase. Owing to the reduction of the gear acting on the backrest adjustment, no rearward adjustment of the backrest in relation to the seat surface is possible if force is introduced outwardly from the rigid backrest frame into the gear. The unit formed by joint and gear, which can form a backrest-adjusting device, acts as a rigid connection. The coupling of the energy absorber allows a decelerated rearward movement of the backrest. The energy absorber co-operates with the guide device, for example a link guide or a different guide device provided on the seat substructure. The energy absorber can be a rigid axis around which the backrest is pivoted forward in normal operation for convenient boarding in the back of the vehicle or an axis provided on the seat substructure or a joint which comes into effect during adjustment of the seat height or fulfils other functions in normal operation. Excessive forces of inertia resulting from the body weight of the vehicle occupant in the event of a rear end collision are reduced by the energy-absorbing action. The energy absorber acts as a load limiter.

An electric motor, in particular a brushless or collectorless d.c. motor having a rotor comprising permanent magnets as poles, is suitable as a driving device. A motor of this type is known, for example, from DE 43 02 042 A1. The stator of the electric motor is supported on the seat substructure, or vehicle body, by an intermediate carrier. The rotor acts with its output shaft on the input side of the backrest-adjusting device. As already explained, the backrest is secured in the respective angular position by rotational self-locking owing to the gear reduction acting in or on the backrest adjustment device.

The forward inclination caused by the rear end collision or the pre-crash sensor by the thus activated driving device can be effected around the joint, in particular a pivot joint around which the backrest is pivoted relative to the seat surface even with conventional backrest adjustment. The output side of the reduction (step-down) gear in this case, is a component of the joint, in particular the pivot joint. During the decelerated opposing rearward movement of the backrest, the backrest is guided on the guide device supported on the vehicle body by the backrest-adjusting device that behaves rigidly owing to the rotational self-locking. For this purpose, the guide device can be supported on the vehicle body by the rigid seat substructure.

The headrest can also be adjusted by the driving device. For this purpose, the driving device, for example via a pulling means optionally adapted to be coupled to a rotating part of the backrest-adjusting device, can release an energy store having a mechanical, pyrotechnic or other design. The adjustable headrest can be designed, for example, as known from DE 197 06 290 A1. A separate energy store for activation in the event of a rear end collision can also be provided.

Advantageously, the energy supply to the driving device, in particular the power supply to the electric motor, is interrupted in such a way that it can no longer be switched on after energy absorption has been activated, i.e. after the rearward movement of the backrest has been decelerated.

The backrest-adjusting device and/or the driving device for backrest adjustment can be provided on both sides of the backrest.

In a preferred manner, the electric motor driving device which is used both during backrest adjustment in normal driving mode and during backrest adjustment in the event of a rear end collision can preferably be a flat motor designed as a brushless or collectorless flat motor of the type described, for example, in DE 43 02 042 A1. An electric motor of this type possesses stator poles that are located on an internal radius, and rotor poles that are arranged around a common axis on an external radius. The axial span of the unit containing the rotor and the stator is substantially smaller in size than the external diameter of the rotor. The stator poles are formed by field windings arranged around laminated poles. The stator carrier is supported in a fixed manner on the motor housing and on the vehicle body, in particular on the seat substructure. It can also comprise a ring gear for a step-down gear, in particular planetary gear, on its internal face. For this purpose, the ring gear can be formed integrally with the stator carrier and exist in the form of internal teeth on the stator carrier. The rotor can be bell-shaped in design and, in the region of its rotor casing, can serve as a carrier for the rotor poles that are preferably designed as permanent magnets.

The driving device can be coupled to the energy absorber for controlled energy absorption during rearward displacement of the backrest in a rear end collision. The desired energy absorption can be adjusted depending on the weight of the vehicle occupant or also depending on a distance measurement per unit of time during backrest adjustment in the crash phase. It is also possible to bring about the desired energy absorption merely by means of the driving device. The electric motor is controlled accordingly for this purpose.

The driving device can also be activated in normal driving mode in order to adjust the backrest forwardly. For example, a convenient adjustment for climbing into the back of two-door vehicles can thus be achieved. At the same time, a retraction of the headrest can be effected by a coupling device, for example in the form of a control cable (Bowden cable) assembly, during the forward pivoting of the backrest. The headrest is brought back into the previous extended position by a memory function when the backrest is pivoted back.

BRIEF DESCRIPTION OF THE DRAWINGS

Embodiments of the invention will be described in more detail with reference to the figures, in which:

FIG. 6 shows a headrest that can simultaneously be extended upwardly with the forwardly displaced backrest, in its original position;

FIG. 7 shows the headrest illustrated in FIG. 6 in the upwardly and obliquely forwardly extended position; and FIG. 8 is a block circuit diagram of a motor controller.

DETAILED DESCRIPTION OF THE INVENTION

Figure 1:
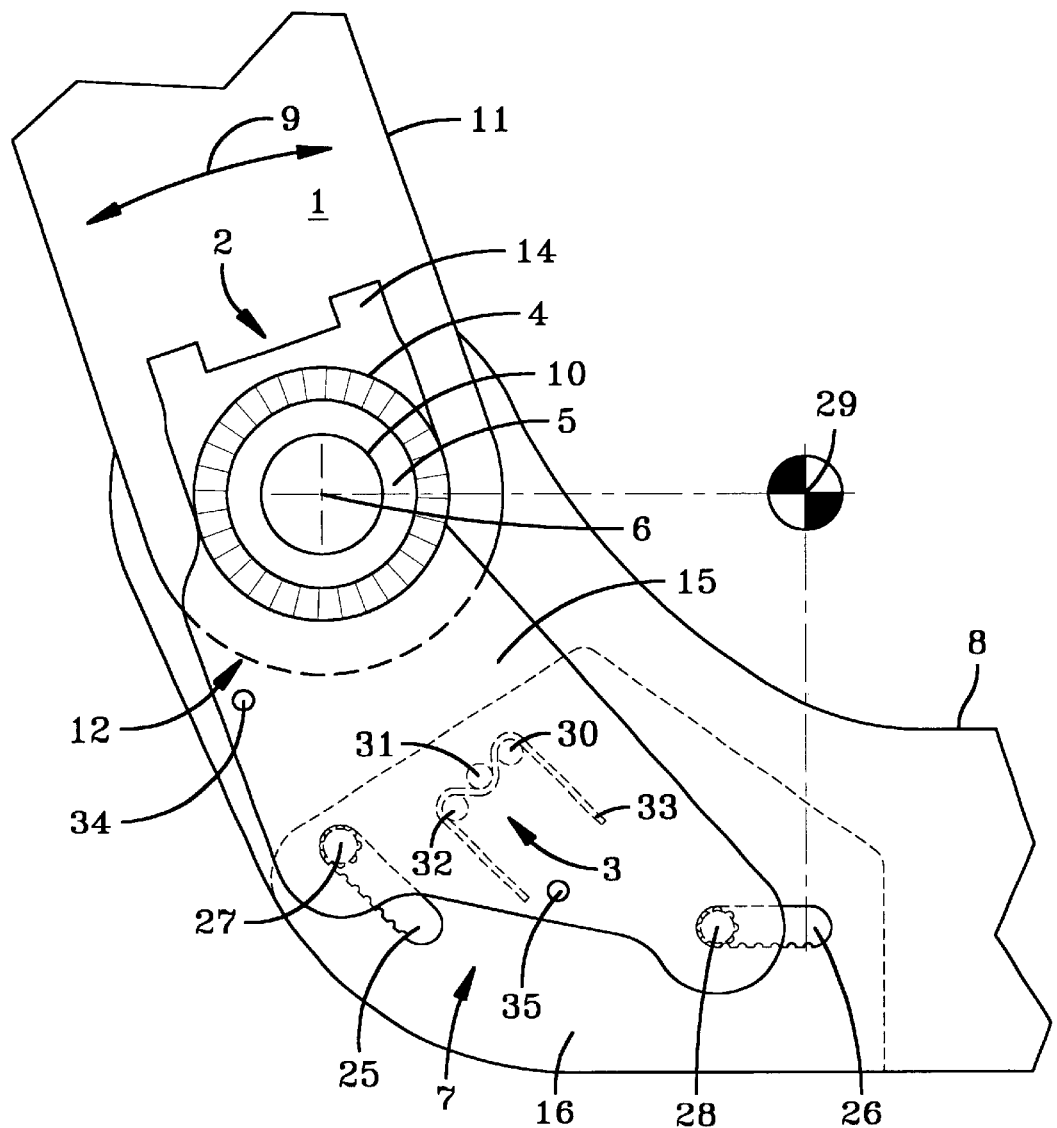
FIG. 1 shows a vehicle seat in the region of a backrest-adjusting device and an energy absorber as an embodiment of the invention in the normal position.

The figures only show the parts of the embodiment of the vehicle seat required for understanding the invention. FIG. 1 shows a vehicle seat in the region of a backrest-adjusting device and an energy absorber as an embodiment of the invention in the normal position. The vehicle seat has a backrest 1 that is adjustable by means of an electric motor-driven driving device 2. In normal driving mode, the backrest 1 is adjustable forward and rearwards (double arrow 9) around a joint, in particular pivot joint 6. As used herein and in the claims the directions "forward", "forwards", "rearward" and "rearwards" are understood to relate to the direction of travel of a motor vehicle that is travelling forward. A drive shaft 10 can be driven by the driving device 2 and transmits the adjustment movement to the backrest 1 via a reduction gear 5 extends coaxially to the pivot joint 6. For this purpose, the pivotal output side of the reduction gear 5 is rigidly connected to a rigid backrest frame 11. The joint, in particular pivot joint 6 and the reduction gear 5, operates as a backrest-adjusting device 12. This unit can be designed as a wobble mechanism, known per se, which serves as a backrest-adjusting device in the conventional manner. The output side of this backrest-adjusting device is formed by a wobble plate 14 rigidly connected to the rigid seat frame 11.

When the known wobble mechanism is used, a cam non-rotatably connected to the drive shaft 10 is rotated by the drive shaft. The cam engages the wobble plate 14 that engages an external ring gear in an internal ring gear of an annular gear supported on the vehicle body. The wobble (tumble) plate 14 is rigidly connected to the rigid backrest frame 11 and forms the output side of the reduction gear 5 and the pivotal joint part of the pivot joint 6.

The backrest-adjusting device 12, for example the annular gear of the wobble mechanism, is supported on the rigid seat substructure 16 via an intermediate carrier 15 and an energy absorber 3 which adopts the position shown in FIG. 1 in the normal driving mode. The intermediate carrier 15 can also be held on the seat substructure 16 by shearing pins 34, 35 or an equivalent holding device. The seat substructure 16 is mounted adjustably on the vehicle body in a known manner by means of rails (upper and lower rails not shown in detail). The intermediate carrier 15 is preferably designed as an intermediate plate.

During backrest adjustment in normal mode, the backrest 1 is pivoted forwards or rearwards (double arrow 9) relative to a seat surface 8, depending on the direction of rotation of the drive shaft 10. The intermediate carrier 15 and the energy absorber 3 maintain the rest position shown in FIG. 1. Owing to the reduction ratio and the resultant rotational self-locking of the reduction gear 5, the backrest 1 remains in a secured position at the selected angle.

The backrest-adjusting device 12 is a component of the driving device 2 that also comprises an electric motor 4 represented only by a continuous contour line denoting the housing. The electric motor 4 is preferably designed as a brushless d.c. motor of the type known from DE 43 02 042 A1. The rotor of the electric motor 4 makes a driving connection with the drive shaft 10. The electric motor 4 can be switched on by either a pre-crash sensor or by a sensor that detects a rear end collision. As used herein and in the claims the term "rear end collision" is understood to mean a collision of a motor vehicle wherein an impact occurs to the rear portion of the vehicle, most often caused by a trailing vehicle running into a leading vehicle. The stator of the electric motor 4 is supported on the intermediate carrier 15.

Figure 2:
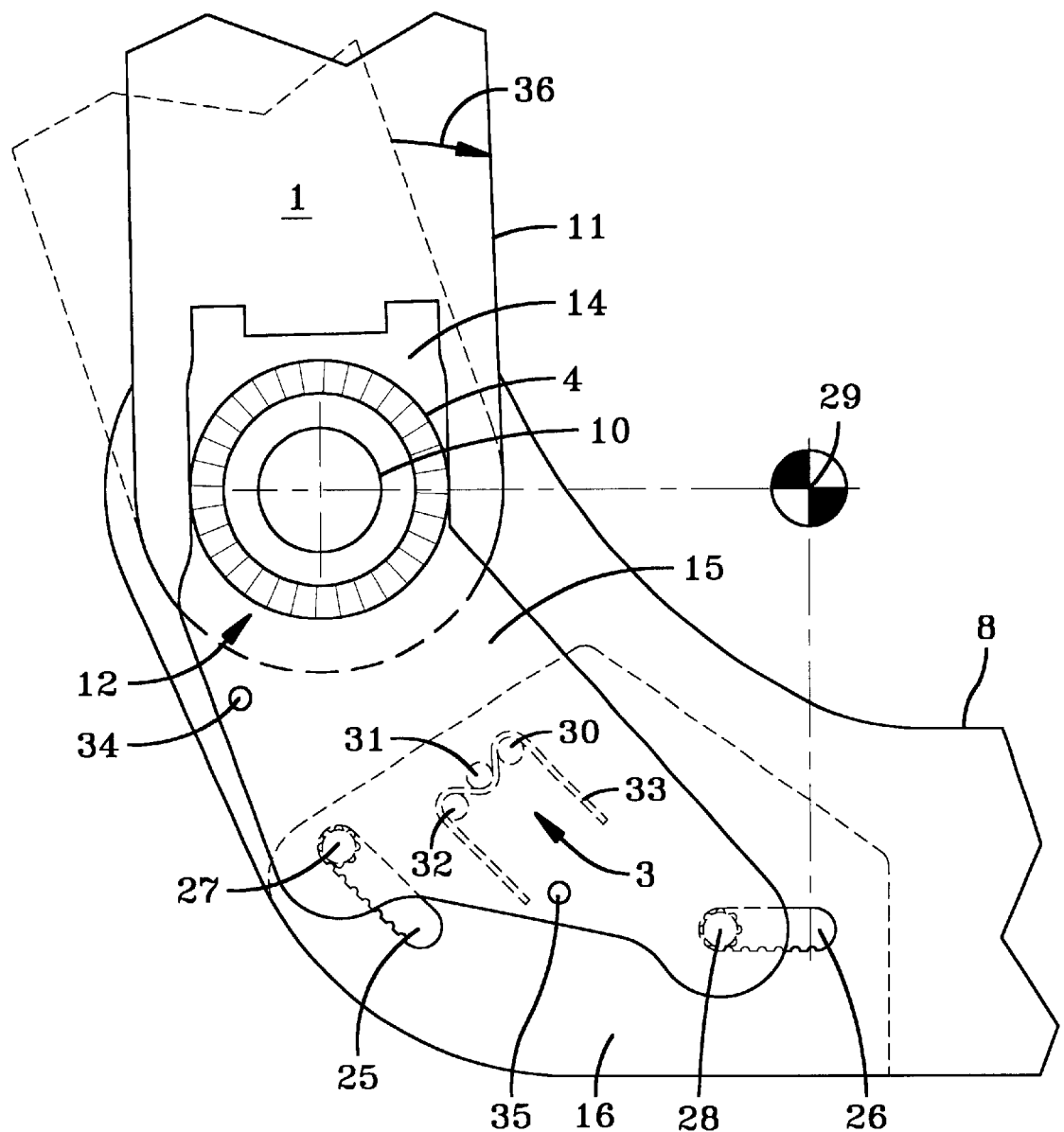
FIG. 2 shows the embodiment illustrated in FIG. 1 after a rear end collision with a forwardly displaced backrest.

FIG. 2 shows the embodiment illustrated in FIG. 1 after a rear end collision with a forwardly displaced backrest. During a rear end collision, the electric motor 4 is switched on with a direction of rotation such that the backrest 1 is pivoted forwardly (arrow 36) around the pivot joint 6. The backrest is brought from the position shown in a broken line into the position shown in solid lines in FIG. 2. During this pivoting movement, the intermediate carrier and the energy absorber 3 remain in the position shown in FIG. 1. The backrest 1 is thus brought into a more upright (vertically oriented) position relative to the seat surface 8 of the vehicle seat. The restraining action of the backrest 1 on a vehicle occupant's body is therefore improved in the event of a rear end collision.

The backrest 1 is held in the forwardly displaced position shown in FIG. 2 by the rotational self-locking in the reduction gear 5 which comes into effect in normal mode. This results in prompt firm contact with the vehicle occupant's head and back during the rear end collision.

Referring now to FIGS. 6 and 7 there is show a headrest that can simultaneously be extended upwardly with the forwardly displaced backrest, in its original position (FIG. 6) and in the upwardly and obliquely forwardly extended position (FIG. 7). Simultaneous with the forward adjustment of the backrest an adjustable cushion part 23 of a headrest 22, provided at the upper end of the backrest 1, is moved upwardly and forwardly. For this purpose, a pulling means 17 can be driven in the direction of the arrow 18 by the electric motor 4 that is shown in FIG. 1. The pulling means 17 can communicate with the electric motor via a coupling, for example a centrifugal coupling (clutch). The pulling means 17 acts on a locking device 19 supported on a supporting device 20 of the headrest. The locking device 19 holds an energy store, which can be formed by a mechanical spring 38, in its tensioned position.

Reference is now made to FIG. 6. Owing to the movement of the pulling means 17 in the direction of the arrow 18, the locking device 19 is released and a rigid cushion guide 21 fastened on the adjustable cushion part 23 is brought along an engagement part 24 which is fastened on the supporting device 20. The adjustable cushion part engages the cushion guide 21, from the original position shown in FIG. 6 into the position shown in FIG. 7. The adjustable cushion part 23 is thus moved upwardly and forwardly a distance L. As known from DE 197 06 290 A1, a pyrotechnic energy store or other energy store can also be provided for headrest adjustment. The energy store can also have an associated crash sensor for the activation thereof, as known from DE 197 06 290 A1.

As a result, prompt support and therefore restraint in the head region of the vehicle occupant in the event of a rear end collision is achieved simultaneously with the improved support of the vehicle occupant's body.

Figure 3:
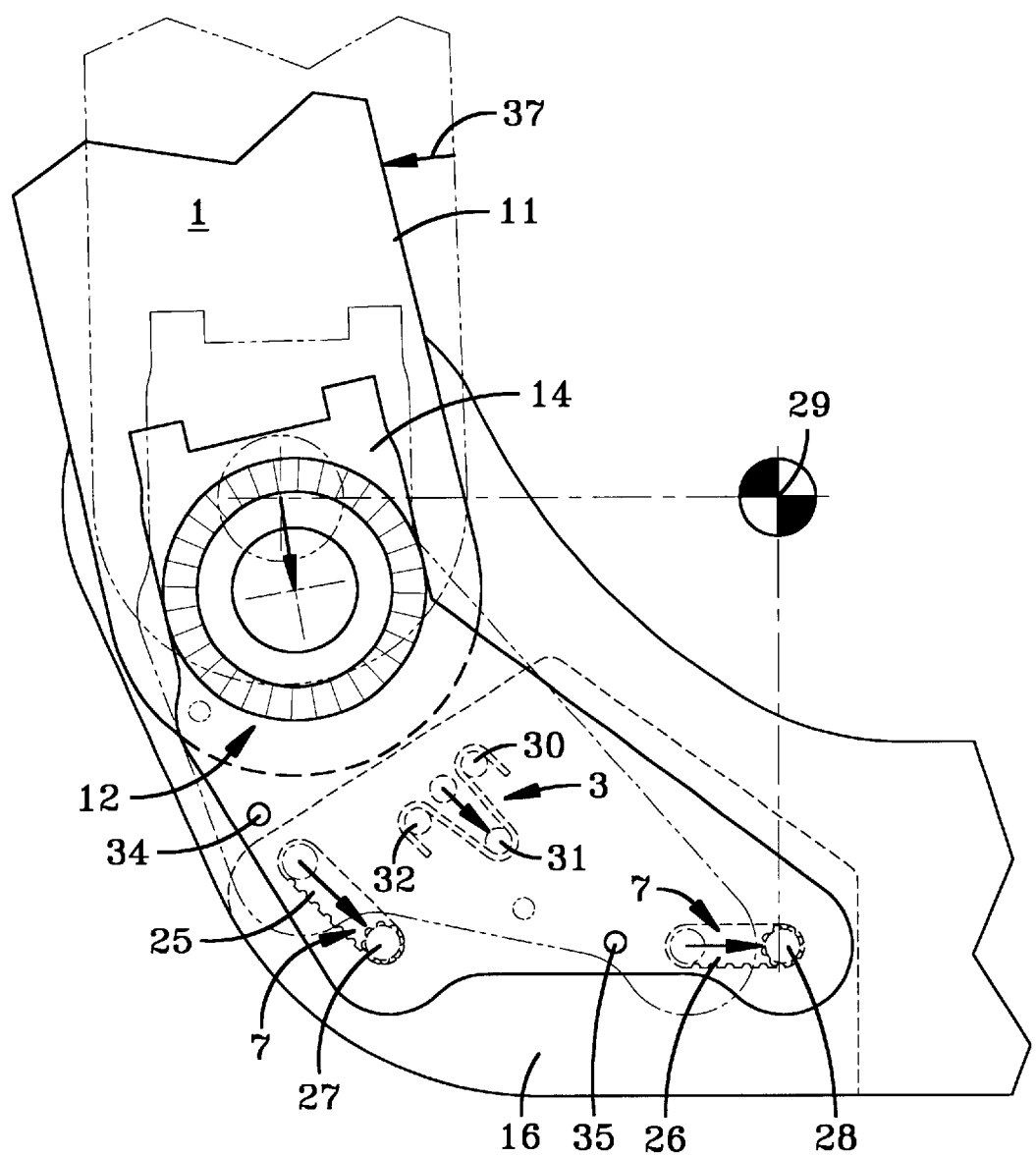
FIG. 3 shows the embodiment illustrated in FIGS. 1 and 2 after the energy absorber has decelerated the rearward movement of the backrest.

FIG. 3 shows the embodiment illustrated in FIGS. 1 and 2 after the rearward movement of the backrest 1 has been decelerated by an energy absorber to avoid excessive loading in the rebound of the vehicle occupant. This decelerated movement can be achieved by corresponding control of the electric motor 4 alone or by the energy absorber 3 or by co-operation of these two components. The rearwards directed movement of the backrest decelerated by the electric motor 4 occurs in the pivot joint 6. The rotational self-locking remains effective in the reduction gear 5 during the rearwards directed movement decelerated by the energy absorber 3. In other words, the backrest 1 does not perform a movement around the pivot joint 6. A guide device 7 that co-operates with the energy absorber 3 is provided for achieving this decelerated rearwards movement of the backrest 1.

In the embodiment in FIGS. 1 to 3 the guide device 7 possesses a link guide in the form of two guide slots 25, 26 provided on the seat substructure 16. Guide pins 27, 28 fastened on the intermediate carrier 15 project into the guide slots 25, 26. The guide pins 27 and 28 can be provided with teeth and be mounted rotatably on the intermediate plate 15. The teeth of the guide pins 27 and 28 can engage corresponding teeth of the guide slots 25 and 26. An imaginary pivot point 29 located outside the pivot joint 6 is defined by this guide device 7. The teeth can also be provided on gear wheels mounted rotatably on the guide pins. A rearward pivoting movement (arrow 37) of the backrest 1 is brought about by the guide device 7 formed in this way.

The energy absorber 3 is designed as a bending brake comprising a bending plate 33 wrapped around three deflecting points 30, 31 and 32. The central deflecting point 31 is movable relative to the two outer deflecting points 30, 32, the bending plate 33 being deformed with energy absorption. This produces the braking action during the rearward movement of the backrest 1 in the rebound phase. In the embodiment illustrated, the outer deflecting points 30, 32 are fastened on the seat substructure 16. The central deflecting point 31 is fastened on the intermediate carrier 15.

In the embodiment illustrated the guide pins 27, 28 move from the positions shown in FIG. 2 into the positions shown in FIG. 3 within the guide slots 25, 26 during the decelerated rearward movement of the backrest 1. At the same time, the central deflecting point 31 moves relative to the two outer deflecting points 30, 32 from the position shown in FIG. 2 into the position shown in FIG. 3. The bending plate 33 is deformed in the process, as already described. The energy thus absorbed by the bending plate 33 limits the load for the vehicle occupant. The shearing pins 34, 35 acting between the seat substructure 16 and the intermediate plate 15 can predetermine a load limit. If this specific load which acts between backrest 1 and vehicle occupant in the rebound phase is exceeded, the shearing pins 34, 35 are sheared off so that the described rearward movement of the backrest 1 relative to the seat substructure 16 can take place.

Figure 4:
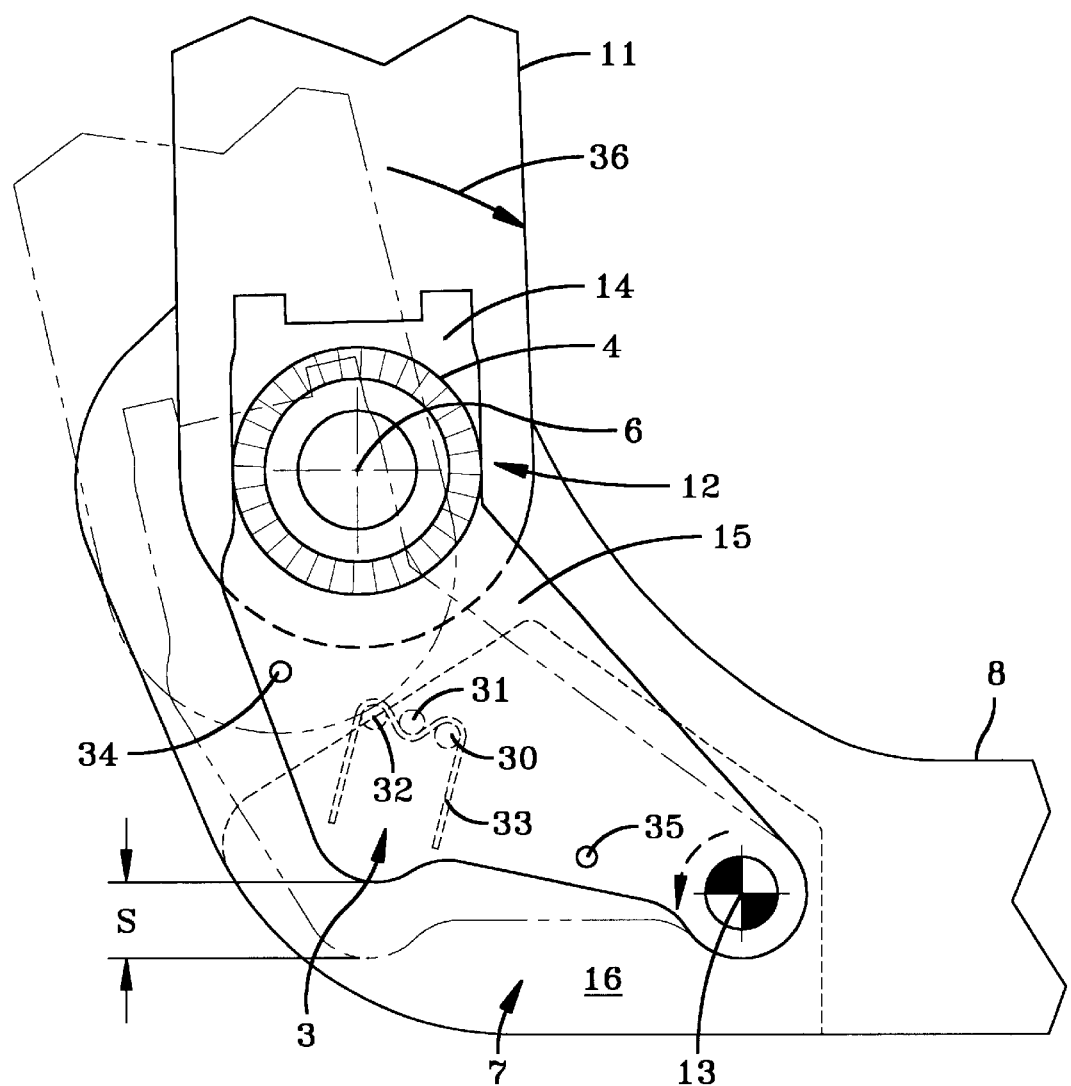
FIG. 4 shows a further embodiment with a backrest that has been displaced forwardly after a rear end collision.
Figure 5:
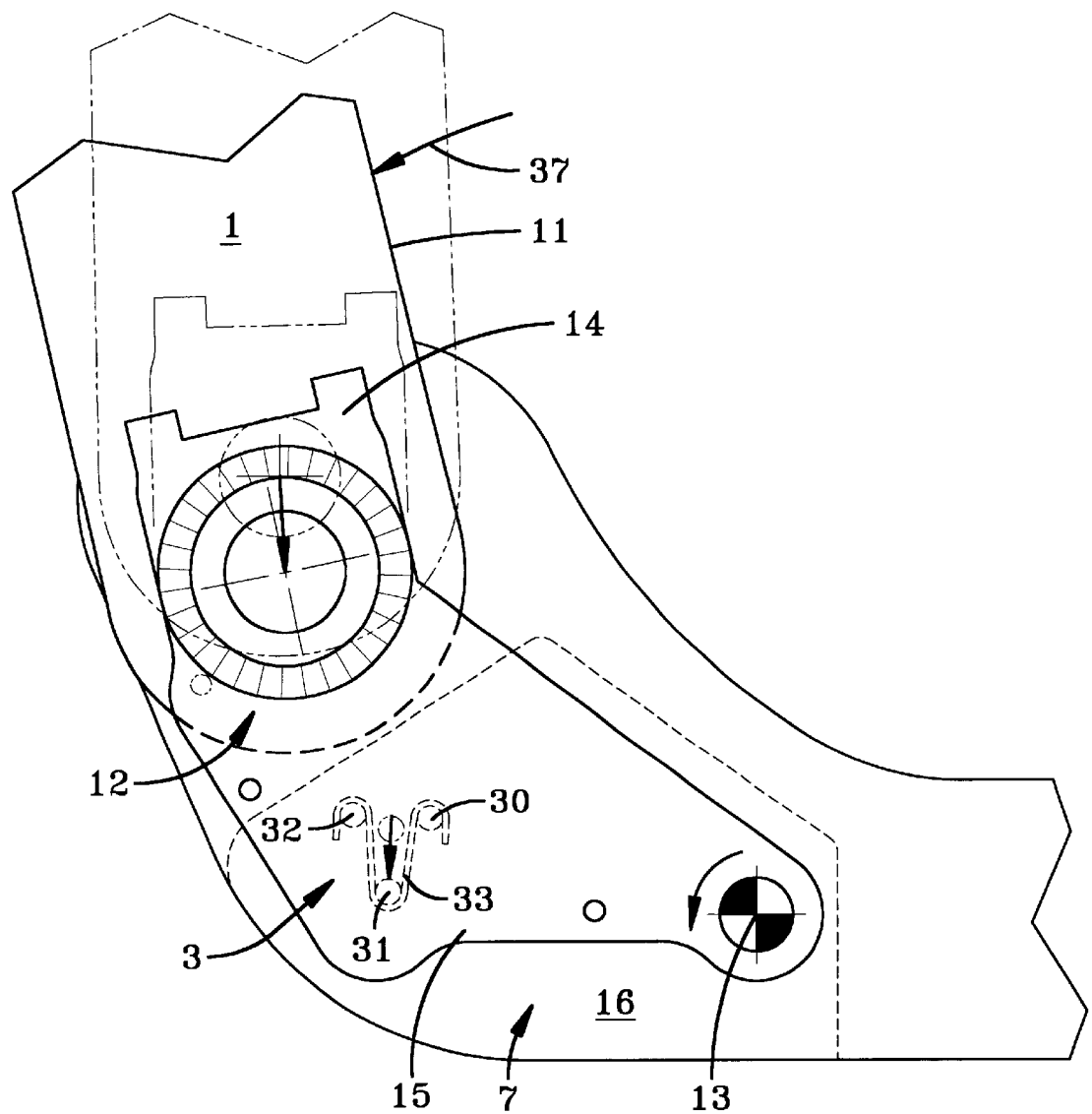
FIG. 5 shows the embodiment of FIG. 4 after the energy absorber has decelerated the rearward movement of the backrest.

FIG. 4 shows a further embodiment with a backrest that has been displaced forwardly after a rear end collision, and FIG. 5 shows the embodiment of FIG. 4 after the rearward movement of the backrest has been decelerated by the energy absorber. In the embodiment shown in FIGS. 4 and 5, the guide device 7 for the decelerated rearward movement of the backrest 1 is formed essentially by a fixed axis 13 provided on the seat substructure. This can be, for example, the pivot axis around which the backrest is pivoted forwardly together with the intermediate carrier 15 to allow convenient climbing into the back region of a two-door vehicle. It can also be a front pivot point of the seat height adjustment or a pivot axis provided for a different seat adjusting function.

In normal driving mode, the intermediate carrier 15 is supported on the seat substructure 16 together with the backrest 1 as in the embodiment of FIGS. 1 to 3 via the energy absorber 3 and optionally shearing pins 34, 35 or a different carrier. In the event of a rear end collision, the backrest 1 is pivoted forwardly (arrow 36 in FIG. 4) as already explained in the embodiment of FIGS. 1 to 3. During the subsequent decelerated rearward pivoting (arrow 37 in FIG. 5) of the backrest 1, the intermediate carrier 15 is pivoted around the fixed axis 13. As already described in connection with the embodiments in FIGS. 1 to 3, the central deflecting point 31 moves from the rest position shown in FIG. 4 into the position shown in FIG. 5. The pivoting movement of the intermediate carrier 15 and the associated backrest 1 is thus decelerated.

FIG. 4 shows the position of the backrest 1 and of the intermediate carrier 15 after the decelerated rearward movement, in broken lines. The pivot path S illustrates the distance that the intermediate carrier 15 has covered in the region of the energy absorber 3.

FIG. 8 is a block circuit diagram of a motor controller. During the rearward movement of the backrest 1, the respectively covered path S can be scanned by means of a measuring device 39 (FIG. 8) and a corresponding measured value derived. This measured value is derived according to time in order to achieve a measured value for the speed of the rearward movement of the backrest. For this purpose, a differentiator 40 can be attached to the distance measuring device 39, as shown in the block circuit diagram of FIG. 8. The measured actual value of the speed of movement is compared in a comparator 42 with a desired speed value stored in a desired value memory 41. The electric motor 4 is controlled as a function of the result of the comparison. The driving action of the electric motor is adjusted in co-operation with the energy absorber 3 in such a way that the desired speed of the rearward movement (direction of arrow 37) of the backrest 1 is achieved with an additive or subtractive effect. The rearward movement (direction of arrow 37) of the backrest 1 is composed of the movement predetermined by the guide device 7 for the intermediate plate 15 and the movement taking place in the joint 6 of the backrest-adjusting device 12.

In the embodiment of FIGS. 1 to 3 also, the movement of the intermediate carrier 15 can take place in the region of the energy absorber 3 for distance measurement by means of the distance measuring device 39. For this purpose, for example, the movement of the central deflecting point 31 can also be scanned in both embodiments.

Furthermore, it is possible to effect the deceleration during the rearward movement (direction of arrow 37) of the backrest 1 in both embodiments only by corresponding activation of the electric motor 4. This decelerated rearward movement essentially takes place in the joint 6 of the backrest-adjusting device 12. In this embodiment, the pivot path covered by the backrest frame 11 during the rearward movement (direction of arrow 37) is also scanned by means of the distance measuring device 39 and evaluated for motor control by the evaluating device shown in FIG. 8.

Therefore, substantially the same speed of movement is achieved during the rearward movement of the backrest 1 irrespective of the size and weight of the vehicle occupant.

Many changes and modifications in the above described embodiments of the invention can, of course, be carried out without departing from the scope thereof. Accordingly that scope is intended to be limited only by the scope of the appended claims.

We claim:

1. A vehicle seat comprising a backrest that is adjustable by means of a pivot joint relative to a seat surface and has an electric motor drive which drives a backrest-adjusting device, the electric motor driving device can be activated by a rear end collision and the backrest leans forward in the event of a rear end collision, and a braking device is provided for opposing rearward movement of the backrest following the forward inclination of the backrest.

2. The vehicle seat according to claim 1 wherein the braking device comprises the electric motor of the driving device.

3. The vehicle seat according to claim 1 wherein the braking device comprises an energy absorber acting between a rigid backrest frame and a rigid seat substructure supported on the vehicle body.

4. The vehicle seat according to claim 3 wherein the energy absorber is supported on the vehicle body via the seat substructure.

5. The vehicle seat according to claim 3 wherein the energy absorber is a bending brake.

6. The vehicle seat according to claim 1 wherein the backrest-adjusting device comprises said joint and a reduction gear.

7. The vehicle seat according to claim 1 wherein the backrest-adjusting device comprises a wobble mechanism.

8. The vehicle seat according to claim 1 wherein the driving device can be activated by a pre-crash sensor.

9. The vehicle seat according to claim 1 wherein the driving device is provided on both sides of the backrest.

10. The vehicle seat according to claim 1 wherein the backrest-adjusting device is provided on both sides of the backrest.

11. The vehicle seat according to claim 10 wherein the driving device is connected to respective backrest-adjusting devices on both sides of the backrest by means of a continuous drive shaft.

* * * * *